United States Patent
Yoshizaki et al.

(10) Patent No.: US 12,121,867 B2
(45) Date of Patent: Oct. 22, 2024

(54) COMPOSITE SEMIPERMEABLE MEMBRANE

(71) Applicant: TORAY INDUSTRIES, INC., Tokyo (JP)

(72) Inventors: Tomoya Yoshizaki, Shiga (JP); Tsuyoshi Hamada, Shiga (JP); Masami Ogata, Shiga (JP); Harutoki Shimura, Shiga (JP); Takafumi Ogawa, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 578 days.

(21) Appl. No.: 17/415,854

(22) PCT Filed: Sep. 30, 2019

(86) PCT No.: PCT/JP2019/038648
§ 371 (c)(1),
(2) Date: Jun. 18, 2021

(87) PCT Pub. No.: WO2020/137066
PCT Pub. Date: Jul. 2, 2020

(65) Prior Publication Data
US 2022/0080363 A1     Mar. 17, 2022

(30) Foreign Application Priority Data
Dec. 26, 2018   (JP) .................... 2018-242776

(51) Int. Cl.
*B01D 69/12*       (2006.01)
*B01D 65/08*       (2006.01)
*B01D 69/02*       (2006.01)
*B01D 69/10*       (2006.01)
*B01D 71/56*       (2006.01)
*B32B 27/34*       (2006.01)

(52) U.S. Cl.
CPC ............ *B01D 69/12* (2013.01); *B01D 65/08* (2013.01); *B01D 69/02* (2013.01); *B01D 69/1071* (2022.08); *B01D 69/1251* (2022.08); *B01D 71/56* (2013.01); *B32B 27/34* (2013.01); *B01D 2325/30* (2013.01); *B32B 2255/10* (2013.01); *B32B 2255/26* (2013.01); *B32B 2307/726* (2013.01)

(58) Field of Classification Search
None
See application file for complete search history.

(56) References Cited

U.S. PATENT DOCUMENTS

| | | | |
|---|---|---|---|
| 6,177,011 B1 | 1/2001 | Hachisuka et al. | |
| 6,280,853 B1 | 8/2001 | Mickols | |
| 2012/0012527 A1 | 1/2012 | Allen et al. | |
| 2014/0183128 A1* | 7/2014 | Lee | B01D 61/025 427/244 |
| 2014/0231338 A1 | 8/2014 | Takaya et al. | |
| 2014/0251892 A1 | 9/2014 | Lee et al. | |
| 2014/0353253 A1* | 12/2014 | Allen | B01D 61/025 427/244 |
| 2016/0008773 A1 | 1/2016 | Yoneda et al. | |

FOREIGN PATENT DOCUMENTS

| | | |
|---|---|---|
| CN | 101439270 A | 5/2009 |
| CN | 103842062 A | 6/2014 |
| CN | 105026022 A | 11/2015 |
| JP | 2003-501249 A | 1/2003 |
| JP | 2012-20281 A | 2/2012 |
| JP | 2015-504389 A | 2/2015 |
| JP | 2015-516876 A | 6/2015 |
| WO | WO 97/34686 A1 | 9/1997 |

OTHER PUBLICATIONS

International Search Report, issued in PCT/JP2019/038648, PCT/ISA/210, dated Dec. 24, 2019.
Written Opinion of the International Searching Authority, issued in PCT/JP2019/038648, PCT/ISA/237, dated Dec. 24, 2019.
Chinese Office Action and Search Report for Chinese Application No. 201980085514.2, dated Jul. 29, 2022, with an English translation.

* cited by examiner

*Primary Examiner* — Ryan B Huang
(74) *Attorney, Agent, or Firm* — Birch, Stewart, Kolasch & Birch, LLP

(57) ABSTRACT

The present invention relates to a composite semipermeable membrane including: a substrate; a porous support layer disposed on the substrate; and a separation functional layer disposed on the porous support layer, in which the separation functional layer includes: a first layer including a cross-linked aromatic polyamide; and a coating layer existing on the first layer and including an aliphatic polyamide including a fluorine atom, and the composite semipermeable membrane has a proportion of the number of fluorine atoms to the total number of atoms of all elements of 0.5% or more and 8% or less, and has a ratio (N/O ratio) of the number of nitrogen atoms to the number of oxygen atoms of 0.8 or more and 1.3 or less.

6 Claims, No Drawings

COMPOSITE SEMIPERMEABLE MEMBRANE

TECHNICAL FIELD

The present invention relates to a composite semipermeable membrane useful for selective separation of liquid mixtures, and to a composite semipermeable membrane having high water permeability and excellent antifouling properties and chemical resistance.

BACKGROUND ART

Examples of membranes used for membrane separation of liquid mixtures include microfiltration membranes, ultrafiltration membranes, nanofiltration membranes, reverse osmosis membranes, and the like, and these membranes are used for, for example, obtaining drinking water from water containing salts or harmful substances, production of industrial ultrapure water, wastewater treatment, and recovery of valuables.

Most of the currently commercially available reverse osmosis membranes and nanofiltration membranes are composite semipermeable membranes. Among these, a composite semipermeable membrane obtained by coating a microporous support membrane with a separation functional layer constituted of a crosslinked polyamide obtained by a polycondensation reaction of a polyfunctional amine with a polyfunctional acid halide is in extensive use as a separation membrane having high permeability and high selectively separating properties.

However, composite semipermeable membranes, when continuously used, suffer adhesion of fouling substances such as organic substances, heavy metals, and microorganisms to surfaces of the membranes and this tends to result in a decrease in the permeation flux of the membranes. Chemical cleaning with an acid, an alkali, etc. is hence necessary after a certain period of operation. Consequently, there is a desire for a composite semipermeable membrane to which fouling substances are less apt to adhere and which changes little in performance through chemical cleaning with an acid, an alkali, etc.

As methods for mitigating the adhesion of fouling substances, a method in which a surface of a separation functional layer is coated with poly(vinyl alcohol) to thereby neutralize the charge state and inhibit fouling (see Patent Document 1); and methods in which, for example, a coating layer including a poly(alkylene oxide) is formed (see Patent Documents 2 and 3) have been proposed.

CITATION LIST

Patent Literature

Patent Document 1: International Publication WO 97/34686
Patent Document 2: JP-T-2003-501249 (The term "JP-T" as used herein means a published Japanese translation of a PCT patent application.)
Patent Document 3: JP-T-2015-516876

SUMMARY OF THE INVENTION

Technical Problems

However, the techniques described in Patent Documents 1 to 3 have problems, for example, in that the effect of inhibiting the adhesion of fouling substances (antifouling properties) is insufficient, that the membrane performance and the antifouling properties are reduced by cleaning with an acid or by storage in an acidic solution, and that the coating of the separation functional layer disadvantageously results in a decrease in water permeability.

An object of the present invention is to provide a composite semipermeable membrane having high water permeability and antifouling properties and exhibiting stable antifouling properties before and after contact with an acid.

Solution to the Problems

In order to solve the problems, the present invention includes any of the following configurations (1) to (7).

(1) A composite semipermeable membrane including:
a substrate;
a porous support layer disposed on the substrate; and
a separation functional layer disposed on the porous support layer,
in which the separation functional layer includes:
a first layer including a crosslinked aromatic polyamide that is a polymer of a polyfunctional aromatic amine and a polyfunctional aromatic acid chloride; and
a coating layer existing on the first layer and including an aliphatic polyamide including a fluorine atom, the aliphatic polyamide being a polymer of a polyfunctional aliphatic carboxylic acid compound and a polyfunctional aliphatic amine, and
the composite semipermeable membrane has a proportion of the number of fluorine atoms to the total number of atoms of all elements of 0.5% or more and 8% or less, as measured by X-ray photoelectron spectrometry conducted by irradiating the composite semipermeable membrane with X rays from a side of the coating layer, and
has a ratio (N/O ratio) of the number of nitrogen atoms to the number of oxygen atoms of 0.8 or more and 1.3 or less, as measured by the X-ray photoelectron spectrometry.

(2) The composite semipermeable membrane according to (1), in which in a static contact angle measurement conducted by vacuum-drying the composite semipermeable membrane at 25° C. for 12 hours and then adhering 2 µL of a droplet of pure water to a surface of the separation functional layer, a contact angle is 20 degrees or less at 30 seconds after adhering the droplet of pure water to the surface of the separation functional layer.

(3) The composite semipermeable membrane according to (2), in which in the static contact angle measurement, the contact angle at 30 seconds after adhering the droplet of pure water to the surface of the separation functional layer is smaller by at least 15 degrees than a contact angle at 1 second after adhering the droplet of pure water to the surface of the separation functional layer.

(4) The composite semipermeable membrane according to any one of (1) to (3), in which the aliphatic polyamide is crosslinked at least either intramolecularly or intermolecularly.

(5) The composite semipermeable membrane according to any one of (1) to (4), in which the aliphatic polyamide is bonded to the first layer by amide bonds.

(6) The composite semipermeable membrane according to any one of (1) to (5), in which the aliphatic polyamide has one or more kinds of structures included in the following structure group (i).

[Chem. 1]

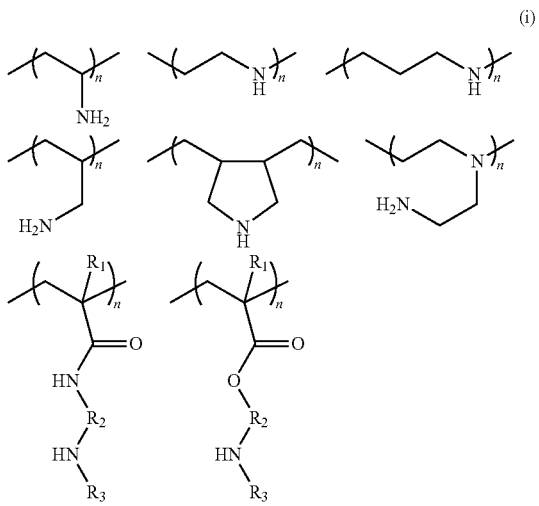

(i)

In which n is an integer of 1 or larger and 100 or smaller. $R_1$ is a hydrogen atom or a methyl group, $R_2$ is an alkylene group having a carbon number of 1 to 3, and $R_3$ is a hydrogen atom or an alkyl group having a carbon number of 1 to 3.

(7) The composite semipermeable membrane according to any one of (1) to (6), in which a surface zeta potential of the separation functional layer at pH 6 is higher by at least 15 mV than a surface zeta potential of the separation functional layer at pH 11.

Advantageous Effects of the Invention

The composite semipermeable membrane of the present invention not only can attain a high salt removal ratio since the separation functional layer thereof includes a crosslinked aromatic polyamide which is a polymer of a polyfunctional aromatic amine and a polyfunctional aromatic acid chloride, but also has high antifouling properties since the separation functional layer has a layer (coating layer) which covers the crosslinked aromatic polyamide. Furthermore, since the separation functional layer of the composite semipermeable membrane of the present invention includes a chemically stable aliphatic polyamide and has fluorine atoms, this composite semipermeable membrane has high water permeability, is apt to retain excellent antifouling properties before and after contact with an acid, and enables a long-term stable operation.

DESCRIPTION OF EMBODIMENTS

The composite semipermeable membrane of the present invention includes: a support membrane including a substrate and a porous support layer; and a separation functional layer formed on the support membrane. The separation functional layer virtually has separation performance. Although the support membrane is permeable to water, it does not virtually have separation performance for ions or the like, and it can impart strength to the separation functional layer.

The separation functional layer includes a first layer, which includes a crosslinked aromatic polyamide that is a polymer of a polyfunctional aromatic amine and a polyfunctional aromatic acid chloride, and a coating layer which exists on the first layer and includes a fluorine-atom-containing aliphatic polyamide that is a polymer of a polyfunctional aliphatic carboxylic acid and a polyfunctional aliphatic amine.

The fluorine-atom-containing aliphatic polyamide which covers the first layer has the function of preventing the adhesion of fouling substances.

Specific examples of composite semipermeable membranes having the function of removing ions from aqueous solutions include RO (reverse osmosis) membranes and NF (nanofiltration) membranes.

Configurations of the present invention are explained in detail below.

(1) Support Membrane

In the present invention, the support membrane includes a substrate and a porous support layer. However, the present invention is not limited to this configuration. For example, the support membrane may be one which includes no substrate and consists of a porous support layer only.

(1-1) Substrate

Examples of polymers forming the substrate include a polyester-based polymer, a polyamide-based polymer, a polyolefin-based polymer, and mixtures or copolymers thereof. Especially preferred of these is fabric of a polyester-based polymer having high mechanical and thermal stability. With respect to the configuration of the fabric, it is preferred to use long-fiber nonwoven fabric, short-fiber nonwoven fabric, or woven or knitted fabric.

(1-2) Porous Support Layer

The porous support layer does not virtually have separation performance for ions or the like and serves to impart strength to the separation functional layer, which virtually has separation function. The porous support layer is not particularly limited in the pore diameter and pore distribution thereof. For example, the porous support layer may have an even pore diameter throughout, or may have a form in which the pore diameter increases gradually from the surface thereof that is in contact with the separation functional layer toward the other surface thereof. Preferred is a porous support layer in which the pore diameter in the surface in contact with the separation functional layer is 0.1 nm or larger and 100 nm or less. Materials usable for forming the porous support layer and the shapes of the porous support layer are not particularly limited.

For forming the porous support layer, use can be made of homopolymers or copolymers such as polysulfones, polyethersulfones, polyamides, polyesters, cellulosic polymers, vinyl polymers, poly(phenylene sulfide), poly(phenylene sulfide sulfone), poly(phenylene sulfone), and poly(phenylene oxide); any of these can be used alone or a mixture of two or more thereof can be used. Usable as the cellulosic polymers are cellulose acetate, cellulose nitrate, and the like. Usable as the vinyl polymers are polyethylene, polypropylene, poly(vinyl chloride), polyacrylonitrile, and the like.

Preferred of these are homopolymers or copolymers such as polysulfones, polyamides, polyesters, cellulose acetate, cellulose nitrate, poly(vinyl chloride), polyacrylonitrile, poly(phenylene sulfide), and poly(phenylene sulfide sulfone). More preferred examples include homopolymers or copolymers of cellulose acetate, polysulfones, poly(phenylene sulfide sulfone), or poly(phenylene sulfone). Generally usable among these materials is a homopolymer or copolymer of polysulfone because this polymer is highly stable chemically, mechanically, and thermally and is easy to mold.

The polysulfone has a weight-average molecular weight (Mw), as determined by gel permeation chromatography (GPC) using N-methylpyrrolidone as a solvent and polystyrene as a reference, of preferably 10.000 or higher and 200,000 or less, more preferably 15,000 or higher and 100,000 or less.

In cases when the Mw of the polysulfone is 10,000 or higher, a porous supporting layer having preferred mechanical strength and heat resistance can be obtained. In cases when the Mw of the polysulfone is 200.000 or less, this polysulfone gives a solution having a viscosity in an appropriate range to enable satisfactory moldability.

For example, an N,N-dimethylformamide (hereinafter referred to as DMF) solution of the polysulfone is cast in a certain thickness on densely woven polyester fabric or on nonwoven polyester fabric and is then wet-coagulated in water. Thus, a porous support layer can be obtained in which most of the surface has fine pores with a diameter of tens of nanometers or less.

The thicknesses of the substrate and porous support layer affect the mechanical strength of the composite semipermeable membrane and the packing density thereof when used as an element. From the standpoint of obtaining sufficient mechanical strength and packing density, the total thickness of the substrate and the porous support layer is preferably 30 μm or larger and 300 μm or less, more preferably 100 μm or larger and 220 μm or less. The thickness of the porous support layer is preferably 20 μm or larger and 100 μm or less. In this description, the term "thickness" means average value unless otherwise indicated. The average value herein refers to arithmetic mean value. Specifically, the thicknesses of the substrate and porous support layer are each determined by examining a section thereof to measure the thickness thereof at 20 points at intervals of 20 μm along a direction (plane direction of the membrane) perpendicular to the thickness direction and calculating an average value of the measured thickness values.

The porous support layer can be selected from among various commercial materials such as "Millipore Filter VSWP" (trade name), manufactured by Millipore Corp., and "Ultra Filter UK10" (trade name), manufactured by Toyo Roshi Ltd., but can be produced in accordance with the method described in "Office of Saline Water Research and Development Progress Report", No. 359 (1%8).

(2) Separation Functional Layer

The separation functional layer is a layer which, in the composite semipermeable membrane, has the function of separating solutes.

The separation functional layer includes a first layer, which includes a crosslinked aromatic polyamide, and a coating layer which exists on the first layer and includes a fluorine-atom-containing aliphatic polyamide. The coating layer virtually has the function of inhibiting the adhesion of fouling substances.

(2-1) Composition

It is preferable that the separation functional layer includes the crosslinked aromatic polyamide as a main component. The term "main component" means a component which accounts for 50 wt % or more of the components of the separation functional layer. The separation functional layer, when including the crosslinked aromatic polyamide in an amount of 50 wt % or more, can show high removal performance. The content of the crosslinked aromatic polyamide in the separation functional layer is preferably 80 wt % or higher, more preferably 90 wt % or higher.

The proportion of the crosslinked aromatic polyamide in the first layer is preferably 80 wt % or higher, more preferably 90 wt % or higher. The first layer may be constituted of the crosslinked aromatic polyamide only.

The first layer is disposed so as to be in contact with the upper surface of the porous support layer (the surface on the reverse side from the surface where the porous support layer is in contact with the substrate).

The crosslinked aromatic polyamide can be formed by chemically reacting a polyfunctional aromatic amine with a polyfunctional aromatic acid chloride. It is preferable that at least one of the polyfunctional aromatic amine and the polyfunctional aromatic acid chloride includes a tri- or higher-functional compound. The inclusion of this compound gives a stiff molecular chain, and a satisfactory pore structure for removing fine solutes such as hydrate ions and boron is formed.

The term "polyfunctional aromatic amine" means an aromatic amine that has, in the molecule, two or more amino groups which each are either a primary amino group or a secondary amino group but at least one of which is a primary amino group. Examples of the polyfunctional aromatic amines include polyfunctional aromatic amines in which two amino groups are bonded to an aromatic ring in ortho, meta, or para positions, such as o-phenylenediamine, m-phenylenediamine, p-phenylenediamine, o-xylylenediamine, m-xylylenediamine, p-xylylenediamine, o-diaminopyridine, m-diaminopyridine, and p-diaminopyridine, and other polyfunctional aromatic amines such as 1,3,5-triaminobenzene, 1,2,4-triaminobenzene, 3,5-diaminobenzoic acid, 3-aminobenzylamine, 4-aminobenzylamine, and the like. In cases when the selectively separating properties, permeability, and heat resistance of the membrane are especially taken into account, it is preferred to use m-phenylenediamine, p-phenylenediamine, and 1,3,5-triaminobenzene. More preferred of these is m-phenylenediamine (hereinafter, also referred to as m-PDA), from the standpoints of availability and handleability. One of those polyfunctional aromatic amines may be used alone, or two or more thereof may be used in combination.

The term "polyfunctional aromatic acid chloride" means an aromatic acid chloride having at least two chlorocarbonyl groups in the molecule. Examples of trifunctional acid chlorides include trimesoyl chloride. Examples of bifunctional acid chlorides include biphenyldicarbonyl dichlonde, azobenzenedicarbonyl dichloride, terephthaloyl chloride, isophthaloyl chloride, and naphthalenedicarbonyl chloride. In cases when the selectively separating properties and heat resistance of the membrane are taken into account, preferred are polyfunctional aromatic acid chlorides each having 2-4 chlorocarbonyl groups in the molecule. Especially from the standpoints of profitability, availability, handleability, ease of reaction, etc., trimesoyl chloride (hereinafter referred to as TMC), which is the acid chloride of 1,3,5-benzenetricarboxylic acid is preferable. One of those polyfunctional aromatic acid chlorides may be used alone, or a mixture of two or more thereof may be used.

At least 90 wt % of each of the polyfunctional aromatic amines and the polyfunctional aromatic acid chlorides which are for constituting the crosslinked aromatic polyamide is preferably accounted for by compounds having a molecular weight less than 1,000, more preferably accounted for by compounds having a molecular weight less than 500. The polyfunctional aromatic amines, at least 90 wt % of which is accounted for by compounds having a molecular weight less than 1,000, and the polyfunctional aromatic acid chlorides, at least 90 wt % of which is accounted for by compounds having a molecular weight less than 1,000, have enhanced solubility in solvents and hence highly efficiently cause interfacial polycondensation. As a result, the obtained thin film of a crosslinked aromatic polyamide has a high solute-separating function.

The crosslinked aromatic polyamide has amide groups derived from the polymerization reaction between the polyfunctional aromatic amines and the polyfunctional aromatic acid chlorides and further has amino and carboxy groups derived from unreacted terminal functional groups. The amount of those functional groups affects the water permeability and salt removal ratio of the composite semipermeable membrane.

In cases when a chemical treatment is conducted after the formation of the crosslinked aromatic polyamide, it is possible to convert functional groups contained in the crosslinked aromatic polyamide or to introduce other functional groups into the crosslinked aromatic polyamide. Thus, the water permeation rate and salt removal ratio of the composite semipermeable membrane can be improved. Examples of the functional groups which can be introduced include alkyl groups, alkenyl groups, alkynyl groups, halogen groups, hydroxyl group, amino group, carboxy group, ether group, thioether group, ester groups, aldehyde group, nitro group, nitroso group, nitrile group, and azo group.

The fluorine-atom-containing aliphatic polyamide is present on the surface of the first layer, that is, on the surface on the reverse side from the surface where the first layer is in contact with the porous support layer. The fluorine-atom-containing aliphatic polyamide may completely cover the first layer or may exist on the first layer so that some of the first layer is exposed. For convenience of explanation, the portion which exists on the first layer and includes a fluorine-atom-containing aliphatic polyamide, including a case where some of the first layer is exposed, is called a "coating layer". The separation functional layer includes the first layer, which includes the crosslinked aromatic polyamide, and the coating layer, which has been disposed on the first layer and includes a fluorine-atom-containing aliphatic polyamide. That is, the substrate, the porous support layer, the first layer, and the coating layer are disposed in this order.

When the fluorine-atom-containing aliphatic polyamide exists in the surface of the separation functional layer, if fouling substances have adhered to the surface of the separation functional layer, the fouling substances are inhibited from adhering to the crosslinked aromatic polyamide. As a result, the crosslinked aromatic polyamide, which virtually has the separation function, is inhibited from being fouled and the composite semipermeable membrane is inhibited from decreasing in performance.

The present inventors diligently made investigations and, as a result, have discovered that the proportion of the number of fluorine atoms to the total number of atoms of all elements (hereinafter sometimes referred to as "proportion F"), which is determined by an examination of the coating-layer-side surface by XPS (X-ray photoelectron spectroscopy), and the ratio of the number of nitrogen atoms to the number of oxygen atoms (N/O ratio), which is also determined by the examination by XPS, affect the antifouling properties and water permeability.

The proportion F and the N/O ratio are determined in the following manners.

Proportion $F(\%)$=(number of fluorine atoms)/(total number of atoms of all elements)×100

N/O ratio=(number of nitrogen atoms)/(number of oxygen atoms)

When the surface of the coating layer has a large number of nitrogen atoms which have high hydrophilicity, it is thought to have the effect of causing water molecules present on the membrane surface as a result of hydration to inhibit the adhesion of fouling substances and to promote removal of adherent fouling substances. The present inventors have further discovered that since the coating layer has fluorine atoms which have a low surface free energy, this coating layer has higher antifouling properties regarding hydrophilic fouling substances than the coating layer containing no fluorine atoms. The present inventors have further discovered that, in water, nitrogen atoms which have high hydrophilicity are apt to be exposed in the surface of the coating layer to enhance the permeation of water into the coating-layer surface and fluorine atoms which have low hydrophilicity are apt to be segregated inside the coating layer to accelerate the movement of water inside the coating layer, thereby enabling the composite semipermeable membrane to have high water permeability.

Specifically, the present inventors have discovered that in cases when the composite semipermeable membrane, in an examination by X-ray photoelectron spectrometry in which the composite semipermeable membrane is irradiated with X rays from the coating-layer side, has a proportion F of 0.5% or more and 8% or less and an N/O ratio of 0.8 or more and 1.3 or less, then this composite semipermeable membrane has high water permeability and shows a smaller decrease in water permeability through an antifouling property test. The proportion F is more preferably 2% or more and 5% or less, and the N/O ratio is more preferably 1.0 or more and 1.2 or less.

The examination by X-ray photoelectron spectroscopy is conducted in the following manner.

The composite semipermeable membrane of the present invention is dried in a vacuum at 25° C. and subjected to wide-scan analysis by X-ray photoelectron spectroscopy, and elements detected in the range of from 0 eV to 1,400 eV are analyzed for composition. Using X-ray photoelectron spectroscope SSX-100, manufactured by SS1, U.S.A., the composite semipermeable membrane was examined under the conditions of excitation X rays of aluminum $K\alpha1$ ray and $K\alpha2$ ray (1,486.6 eV), an X-ray output of 10 kV and 20 mV, and a photoelectron take-off angle of 30'. The examination was made in three different positions in the composite semipermeable membrane, and an average for the three positions is taken as a measured value.

(2-2) Chemical Structure of the Coating Layer

The coating layer includes a fluorine-atom-containing aliphatic polyamide formed by reacting a polyfunctional aliphatic amine with a polyfunctional aliphatic carboxylic acid compound, and has the functional groups and polymer structure explained below.

It is preferable that the fluorine-atom-containing aliphatic polyamide has been crosslinked at least either intermolecularly or intramolecularly. This crosslinking is preferred from the standpoint of maintaining the antifouling properties over a long period, because the aliphatic polyamide having a crosslinked structure can retain the function even after having been cut at one position. Examples of the crosslinked structure include: a structure formed by crosslinking a linear polymer with a crosslinking agent; and a structure formed by connecting molecules of a three-dimensional reticulated polymer, pendant polymer, or dendrimer at a plurality of sites.

From the standpoints of availability and of attaining a high amino group density, it is preferable that the fluorine-atom-containing aliphatic polyamide includes one or more of structures included in the following structure group (i).

[Chem. 2]

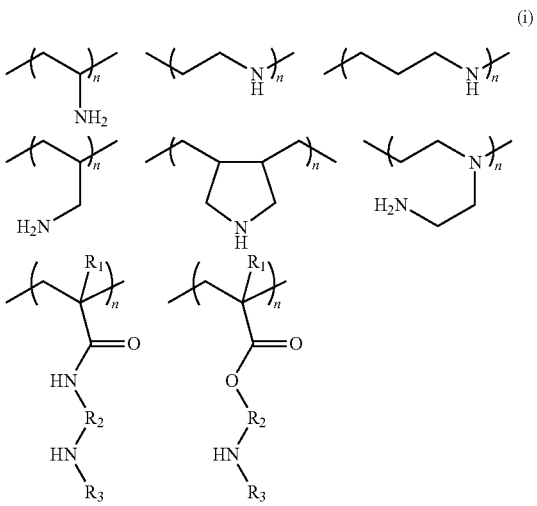

(i)

In the formulae, n is an integer of 1 or larger and 100 or smaller, $R_1$ is a hydrogen atom or a methyl group, $R_2$ is an alkylene group having 1 to 3 carbon atoms, and $R_3$ represents a hydrogen atom or an alkyl group having 1 to 3 carbon atoms.

Examples of the alkylene group having 1 to 3 carbon atoms include methylene groups, ethylene groups, and n-propylene groups. Examples of the alkyl group having 1 to 3 carbon atoms include methyl groups, ethyl groups, n-propyl groups, and isopropyl groups.

The aliphatic polyamide is a nonaromatic polymer. A nonaromatic polymer is a polymer having no aromatic rings. The polymer (aliphatic polyamide) of a polyfunctional aliphatic amine and a polyfunctional aliphatic carboxylic acid compound, which is included in the coating layer, is formed by reacting the polyfunctional aliphatic amine which is not an aromatic compound with the polyfunctional aliphatic carboxylic acid compound which is not an aromatic compound, and hence contains no aromatic compounds.

(2-2-1) Functional Groups (2-2-1-1) Fluorine Atoms

The aliphatic polyamide constituting the coating layer contains fluorine atoms. The surface free energy of the coating layer and the rate of water-molecule permeation inside the coating layer are controlled by properly regulating the fluorine atoms contained in the coating layer, thereby contributing to the desired state shown above in (2-1). Specifically, fluorine atoms are present as a functional group of the structure shown by —$CF_2$— or —$CF_3$. This functional group, in an examination by X-ray photoelectron spectroscopy in which the composite semipermeable membrane of the present invention is irradiated with X rays from the coating-layer-side surface thereof, gives an F1s peak which has one or more maximal values in the range of from 680 eV to 695 eV.

(2-2-1-2) Amide Groups

The aliphatic polyamide constituting the coating layer has a plurality of amide groups since it is a polyamide. The inclusion of the plurality of amide groups therein enables the coating layer to retain moderate hydrophilicity and regulates the amount of water contained in the coating layer, thereby contributing to the desired state shown above in (2-1). Furthermore, the inclusion of amide groups makes it possible to ensure satisfactory acid resistance.

(2-2-2) Polymer Structure

The coating layer includes an aliphatic polyamide which is a polymer of a polyfunctional aliphatic amine and a polyfunctional aliphatic carboxylic acid compound. Furthermore, the aliphatic polyamide constituting the coating layer of the present invention contains the "fluorine atoms" and "amide groups" shown above in (2-2-1). More specifically, the polyamide constituting the coating layer of the present invention has a structure in which units of the polyfunctional aliphatic amine which have the "fluorine atoms" and/or units of the polyfunctional aliphatic carboxylic acid compound which have the "fluorine atoms" have been bonded to each other by the "amide groups".

Those units have been alternately arranged with the amide bonds interposed therebetween, and the amount of each kind of units to be introduced can be suitably regulated. At that time, the specific chemical structures of the units can be suitably selected from among the compounds shown below as examples.

(2-2-2-1) Units Having "Fluorine Atoms"

The units having "fluorine atoms" each specifically are a unit having 1-10 carbon atoms and containing a functional group of the structure shown by —$CF_2$— or —$CF_3$. This unit may contain an ether bond, and may contain a structure such as, for example, $CF_3$—O—$CF_2$—, —$CF_2$—O—$CF_2$—, $CF_2$—$CH_2$—O—, or —$CF(CF_3)$—.

The unit needs to be contained in at least either of the polyfunctional aliphatic amine and the polyfunctional aliphatic carboxylic acid compound which are for forming the aliphatic polyamide (nonaromatic polymer) constituting the coating layer.

Suitable for use as the polyfunctional aliphatic amine is a compound having the unit and two or more amino groups. Suitable for use as the polyfunctional aliphatic carboxylic acid compound is a compound having the unit and one or more carboxylic acid groups or one or more functional groups (acid chloride, acid fluoride, etc.) derived from a carboxylic acid.

From the standpoint of availability, it is preferred to use a polyfunctional aliphatic carboxylic acid compound having one or two carboxylic acid groups or one or two functional groups (acid chloride, acid fluoride, etc.) derived from a carboxylic acid. This acid compound can be suitably selected from among commercial products. Specific examples thereof include perfluoroalkanoyl fluorides, perfluorosuccinoyl fluoride, hexafluoroglutaryl fluoride, octafluoroadipoyl fluoride, perfluoropolyether diacryl fluoride, perfluoroalkanoic acids, perfluorosuccinic acid, perfluoroglutaric acid, perfluoroadipic acid, perfluoroalkanedioic acids, perfluoro-3,6-dioxaoctane-1,8-dioic acid, and perfluoro-3,6,9-trioxaundecane-1,11-dioic acid. Incidentally, since structures formed by the condensation of an epoxy group with an amino group have poor acid resistance, a compound having an epoxy group is not used in the present invention.

(2-3) Properties of the Separation Functional Layer

It is desirable that in a static contact angle measurement conducted by vacuum-drying the composite semipermeable membrane of the present invention at 25° C. for 12 hours and then adhering a droplet of 2 μL of pure water to the surface of the separation functional layer (specifically, the coating-layer-side surface of the separation functional layer), the separation functional layer has a contact angle of 20 degrees or less at 30 seconds after the adhesion of the pure-water droplet to the surface of the separation functional layer. The contact angle herein is static contact angle, and indicates the degree of hydrophilicity of the surface of the separation functional layer, the smaller the contact angle, the higher the hydrophilicity.

After a droplet of pure water is adhered to the surface of the separation functional layer, equation (1) holds, the equation being called Young's equation.

$$\gamma_S = \gamma_L \cos\theta + \gamma_{SL} \quad (1)$$

In equation (1), $\gamma_S$ is the surface tension of the separation functional layer, $\gamma_L$ is the surface tension of the pure water, and $\gamma_{SL}$ is interfacial tension between the separation functional layer and the pure water. The angle $\theta$ between a tangent to the pure water and the surface of the separation functional layer at the time when the equation holds is referred to as contact angle.

The contact angle gradually decreases with the lapse of time after the adhesion of the droplet of pure water and converges to a certain value in 30 seconds. This value has the same meaning as the hydrophilicity of the surface of the separation functional layer in water. The time period from the adhesion of a pure-water droplet to the surface of the separation functional layer to a measurement of the contact angle is 30 seconds. Longer periods required before the measurement are undesirable because the vaporization of some of the water droplet affects the results of the measurement. The amount of the pure water to be dropped is preferably 2 µL because the weight of this water droplet exerts little influence on the measured value and the vaporization affects little.

Having the contact angle of the pure water of 20 degrees or less at 30 seconds after the adhesion of the pure-water droplet to the separation functional layer means that the separation functional layer has high hydrophilicity in water. In general, the higher the hydrophilicity of the surface of a separation functional layer, the higher the water permeability. It is, however, known that separation functional layers having higher hydrophilicity suffer a larger decrease in water permeability due to fouling because the frequency of contact between foulants and the separation functional layers increases. The present inventors diligently made investigations and, as a result, have discovered that in cases when a separation functional layer includes a coating layer including an aliphatic polyamide which is a polymer of a polyfunctional aliphatic carboxylic acid and a polyfunctional aliphatic amine and when the separation functional layer includes fluorine atoms, then this separation functional layer can have both high water permeability and high antifouling properties even when the contact angle between the separation functional layer and pure water is 20 degrees or less. The contact angle therebetween is more preferably 10 degrees or less.

The present inventors have further discovered that in cases when the contact angle at 30 seconds after the adhesion of a pure-water droplet to the surface of the separation functional layer is smaller by at least 15 degrees than a contact angle as measured at 1 second after the adhesion of the pure-water droplet to the surface of the separation functional layer, then this separation functional layer has improved antifouling properties. Considerable changes of the contact angle with the lapse of time after the adhesion of a pure-water droplet means that the contact with water is highly effective in improving the hydrophilicity of the surface. In the case of having considerable contact angle changes, even if the hydrophilicity of the surface of the separation functional layer has temporarily decreased due to contact with a fouling substance during operation, the surface is immediately hydrophilized by contact with water. It is hence thought that water molecules combined by hydration have the improved effect of promoting removal of the fouling substance.

The present inventors diligently made investigations and, as a result, have discovered that there is a close relationship between the surface zeta potential of a separation functional layer and the removability of fouling substances from the composite semipermeable membrane.

Zeta potential is a measure of net charges fixed to the surface of an ultrathin film layer. The zeta potential of the surface of a separation functional layer can be determined from electrical mobility using the Helmholtz-Smoluchowski equation shown below as equation (2).

[Math. 1]

$$\text{Zeta potential } \zeta = \frac{4\pi\eta U}{\varepsilon} \quad (2)$$

(In equation (2), U is electrical mobility, ε is the permittivity of a solution, and η is the viscosity of the solution.)

As the permittivity and viscosity of the solution, use is made of values for measurement temperature given in the literature.

The principle of a zeta potential measurement is explained. In a solution or aqueous solution in contact with a material, there is an immovable stationary layer near the surface of the material because of the influence of charges of the surface. The zeta potential is a potential of the material with respect to the solution lying at the boundary (slip plane) between the stationary layer and the fluidized layer.

Here, an aqueous solution in a quartz glass cell is considered. Since the surface of the quartz usually has negative charges, ions and particles having positive charges gather in the vicinity of the cell surface. Meanwhile, in the center of the cell, ions and particles having negative charges are present in a higher concentration, resulting in an ion distribution in the cell. Upon application of an electric field to the solution in that state, ions in the cell move at different migration speeds depending on positions within the cell (referred to as electro-osmosis flow) in accordance with the ion distribution in the cell. Since the migration speeds reflect the charges on the cell surface, the charges on the cell surface (surface potential) can be evaluated by determining a distribution of the migration speeds.

In a measurement of zeta potential, a membrane sample having a size of 20 mm×30 mm is usually used. Standard particles to be electrophoresed are polystyrene particles (particle diameter, 520 nm), the surface of which has been coated with hydroxypropyl cellulose, and the polystyrene particles are dispersed in an aqueous NaCl solution having a given concentration to obtain a dispersion for the measurement. As an apparatus for the measurement, use can be made, for example, of electrophoresis light-scattering photometer ELS-8000, manufactured by Otsuka Electronics Co., Ltd.

It is desirable that in the composite semipermeable membrane of the present invention, the surface zeta potential of the separation functional layer at pH 6 is higher by at least 15 mV than the surface zeta potential of the separation functional layer at pH 11 under the conditions of an NaCl concentration of 10 mM.

The first layer of the separation functional layer contains amino groups derived from the polyfunctional aromatic amine and carboxy groups derived from the polyfunctional aromatic acid chloride. Meanwhile, the coating layer contains amino groups derived from the polyfunctional aliphatic amine and carboxy groups derived from the polyfunctional carboxylic acid compound. The value of surface zeta potential changes depending on the degrees of dissociation of these functional groups contained in the first layer and the coating layer.

The surface zeta potential at pH 6 of the separation functional layer relates to the property of adsorbing membrane-fouling substances. In cases when a change in pH from a neutral range to an alkaline range results in a large change in surface zeta potential, this membrane having fouling substance adherent thereto has improved recovering property of the permeation rate. This is thought to be because the pH change causes a large change in charge balance on the surface of the separation functional layer and the resultant change in hydrophilicity and electrostatic repulsion promote the elimination of fouling substances adherent to the surface of the separation functional layer. In cases when the surface zeta potential at pH 6 of the separation functional layer is higher by at least 15 mV than the surface zeta potential at pH 11 thereof, the removal of fouling substances adherent to the surface of the separation functional layer is sufficiently promoted, thereby obtaining high recovering property of the permeation rate.

(2-4) Method of Forming the Separation Functional Layer

The separation functional layer is obtained by: forming a first layer including a crosslinked aromatic polyamide obtained by chemically reacting a polyfunctional aromatic amine with a polyfunctional aromatic acid chloride; and thereafter forming, on the first layer, a coating layer including an aliphatic polyamide having fluorine atoms. Interfacial polymerization is the most preferred method for the chemical reaction for forming the first layer, from the standpoints of production efficiency and performance. Steps for the interfacial polymerization are explained below.

The steps for the interfacial polymerization include: (a) a step in which an aqueous solution containing a polyfunctional aromatic amine (aqueous polyfunctional-aromatic-amine solution) is brought into contact with a surface of a porous support layer; (b) a step in which an organic-solvent solution A containing a polyfunctional aromatic acid chloride dissolved therein is brought into contact with the porous support layer with which the aqueous solution containing the polyfunctional aromatic amine has been contacted; (c) a step in which an organic-solvent solution B containing the polyfunctional aromatic acid chloride dissolved therein is further brought into contact therewith and this porous support layer is heated; and (d) a step in which the excess organic solvent remaining after the reaction is removed.

In this explanation, the support membrane shown as an example includes a substrate and a porous support layer. However, in the case of a support membrane having another configuration, "porous support layer" may be interpreted as "support membrane".

In step (a), the concentration of the polyfunctional aromatic amine in the aqueous polyfunctional-aromatic-amine solution is preferably in the range of 0.1 wt % or higher and 20 wt % or less, more preferably in the range of 0.5 wt % or higher and 15 wt % or less. In cases when the concentration of the polyfunctional aromatic amine is within that range, sufficient solute-removing performance and water permeability can be obtained.

The aqueous polyfunctional-aromatic-amine solution may contain a surfactant, an organic solvent, an alkaline compound, an antioxidant, etc. so long as these ingredients do not inhibit the reaction between the polyfunctional aromatic amine and the polyfunctional aromatic acid chloride. Surfactants have the effects of improving the wettability of the surface of the support membrane and reducing the interfacial tension between the aqueous polyfunctional-aromatic-amine solution and nonpolar solvents. Some organic solvents act as catalysts for the interfacial polycondensation reaction, and there are cases where addition thereof enables the interfacial polycondensation reaction to be conducted efficiently.

It is preferable that the aqueous polyfunctional-aromatic-amine solution is evenly and continuously brought into contact with the porous support layer. Specific examples of methods for such contact include: a method in which the aqueous polyfunctional-aromatic-amine solution is applied to the porous support layer by coating; and a method in which the porous support layer is immersed in the aqueous polyfunctional-aromatic-amine solution. The time period during which the porous support layer is in contact with the aqueous polyfunctional-aromatic-amine solution is preferably 1 second or longer and 10 minutes or less, more preferably 10 seconds or longer and 3 minutes or less.

After the contact of the aqueous polyfunctional-aromatic-amine solution with the porous support layer, the porous support layer is sufficiently drained so that no droplets remain on the membrane. Sufficiently draining the porous support layer makes it possible to avoid a trouble that portions where droplets remain become membrane defects after the formation of the porous support layer to reduce the removal performance. As a method for the draining, use can be made, for example, of a method in which the support membrane which has been contacted with the aqueous polyfunctional-aromatic-amine solution is vertically held to allow the excess aqueous solution to flow down naturally, as described in JP-A-H2-78428, or a method in which a gas such as nitrogen is blown from an air nozzle against the support membrane to forcedly drain the support membrane. After the draining, the membrane surface can be dried to remove some of the water contained in the aqueous solution.

In steps (b) and (c), the concentrations of the polyfunctional aromatic acid chloride in the organic-solvent solutions (solution A and solution B) are preferably in the range of 0.01 wt % or higher and 10 wt % or less, more preferably in the range of 0.02 wt % or higher and 2.0 wt % or less. This is because a sufficient reaction rate is obtained by regulating the concentrations of the polyfunctional aromatic acid chloride to 0.01 wt % or higher and the occurrence of side reactions can be inhibited by regulating the concentrations thereof to 10 wt % or less.

The organic solvent is preferably a water-immiscible organic solvent in which the polyfunctional aromatic acid chloride can be dissolved and which does not damage the support membrane. Any such solvent may be used so long as it is inert to both the polyfunctional aromatic amine and the polyfunctional aromatic acid chloride. Preferred examples thereof include hydrocarbon compounds such as n-nonane, n-decane, n-undecane, n-dodecane, isooctane, isodecane, and isododecane and mixed solvents thereof.

For bringing the organic-solvent solution A of the polyfunctional aromatic acid chloride into contact with the porous support layer which has been contacted with the aqueous polyfunctional-aromatic-amine solution, use may be made of the same method as that used for coating the porous support layer with the aqueous polyfunctional-aromatic-amine solution.

In step (c), the organic-solvent solution B containing the polyfunctional aromatic acid chloride dissolved therein is brought into contact with the porous support layer and this porous support layer is heated. The temperature at which the porous support layer is heated is preferably 50° C. or higher and 180° C. or lower, preferably 60° C. or higher and 160° C. or lower. By heating the porous support layer at a temperature within that range, heat and concentration of the solution synergistically produce the effect of accelerating the interfacial polymerization reaction.

In step (d), the organic solvent is removed by the step of draining the organic solvent after the reaction. For removing the organic solvent, use can be made, for example, of a method in which the membrane is vertically held to allow the excess organic solvent to flow down naturally, a method in which air is blown against the membrane with a blower for thereby drying and removing the organic solvent, or a method in which the excess organic solvent is removed with a mixture fluid of water and air.

(2-4-1) Method of Forming the Coating Layer

The coating layer is formed on the surface of the first layer, which includes the crosslinked aromatic polyamide. In this step, the coating layer may be formed by directly reacting the polyfunctional aliphatic amine with the polyfunctional aliphatic carboxylic acid compound on the surface of the first layer. Alternatively, the coating layer may be formed by coating the surface of the first layer with a solution containing a polymer (aliphatic polyamide) which has been synthesized beforehand. The coating layer may be formed also by immersing the membrane including the first layer in a solution containing a polymer (aliphatic polyamide) which has been synthesized beforehand. Furthermore, the coating layer may be formed by preparing a composite-semipermeable-membrane element that will be described later and then passing the polymer solution therethrough.

For synthesizing the polymer (aliphatic polyamide), a reaction between the polyfunctional aliphatic amine and the polyfunctional aliphatic carboxylic acid compound is utilized. In this case, amide bonds are formed by a reaction between amino groups and either carboxylic acid groups or functional groups (e.g., acid chloride or acid fluoride) derived from a carboxylic acid. From the standpoint of efficiently conducting the reaction in a short time period, it is preferred to utilize any of various reaction aids (condensation promoters) according to need.

Examples of the condensation promoters include sulfuric acid, 4-(4,6-dimethoxy-1,3,5-triazin-2-yl)-4-methylmorpholinium chloride (DMT-MM), 1-(3-dimethylaminopropyl)-3-ethylcarbodiimide hydrochloride, N,N'-dicyclohexylcarbodiimide, N,N'-diisopropylcarbodiimide, N,N'-carbonyldiimidazole, 1,1'-carbonyldi(1,2,4-triazole), 1H-benzotriazol-1-yloxytris(dimethylamino)phosphonium hexafluorophosphate, 1H-benzotriazol-1-yloxytris(dimethylamino)phosphonium hexafluorophosphate, (7-azabenzotriazol-1-yloxy)tripyrrolidinophosphonium hexafluorophosphate, chlorotripyrrolidinophosphonium hexafluorophosphate, bromotris(dimethylamino)phosphonium hexafluorophosphate, 3-(diethoxyphosphoryloxy)-1,2,3-benzotriazin-4(3H)-one, O-(benzotriazol-1-yl)-N,N,N',N'-tetramethyluronium hexafluorophosphate, O-(7-azabenzotriazol-1-yl)-N,N,N',N'-tetramethyluronium hexafluorophosphate, O—(N-succinimidyl)-N,N,N',N'-tetramethyluronium tetrafluoroborate, O—(N-succinimidyl)-N,N,N',N'-tetramethyluronium hexafluorophosphate, O-(3,4-dihydro-4-oxo-1,2,3-benzotriazin-3-yl)-N,N,N',N'-tetramethyluronium tetrafluoroborate, (4,6-dimethoxy-1,3,5-triazin-2-yl)-(2-octoxy-2-oxoethyl)dimethylammonium trifluoromethanesulfonate, S-(1-oxide-2-pyridyl)-N,N,N',N'-tetramethyluronium tetrafluoroborate, O-[2-oxo-1(2H)-pyridyl]-N,N,N',N'-tetramethyluronium tetrafluoroborate, {{[(1-cyano-2-ethoxy-2-oxoethylidene)amino]oxy}-4-morpholinomethylene}dimethylammonium hexafluorophosphate, 2-chloro-1,3-dimethylimidazolinium hexafluorophosphate, 1-(chloro-1-pyrrolidinylmethylene)pyrrolidinium hexafluorophosphate, 2-fluoro-1,3-dimethylmidazoliniumhexafluorophosphate, and fluoro-N,N,N',N'-tetramethylformanudiniumhexafluorophosphate.

The reaction time and the concentrations in synthesizing the aliphatic polyamide can be suitably regulated in accordance with the solvent and condensation promoter to be used and the chemical structure of the compound. From the standpoint of production efficiency, however, the reaction time is preferably 24 hours or less, more preferably 12 hours or less, still more preferably 6 hours or less, especially preferably 1 hour or less. After completion of the reaction, the residual compounds may be removed beforehand to purify the polymer.

(2-5) Chemical Bonds Between the Coating Layer and the First Layer

The coating layer and the first layer may have been linked to each other by chemical bonds. The state in which the coating layer and the first layer have formed chemical bonds therebetween is preferred because the coating layer can be present more stably. It is preferable that the chemical bonds between the coating layer and the first layer are covalent bonds. The chemical bonds between the coating layer and the first layer are especially preferably amide bonds from the standpoints that functional groups possessed by the polymer constituting each layer can be used and that the stability of performance can be ensured before and after contact with an acid.

Specifically, amide bonds may be formed by a reaction between amino groups of the aliphatic polyamide for constituting the coating layer and carboxylic acid groups or carboxylic-acid-derived functional groups (e.g., acid chloride or acid fluoride) of the crosslinked aromatic polyamide constituting the first layer. Alternatively, amide bonds may be formed by a reaction between carboxylic acid groups or carboxylic-acid-derived functional groups of the aliphatic polyamide for constituting the coating layer and amino groups of the crosslinked aromatic polyamide constituting the first layer. Thus, amide bonds can be formed between the aliphatic polyamide constituting the coating layer and the first layer.

The amide bonds are formed when the crosslinked aromatic polyamide constituting the first layer comes into contact with the aliphatic polyamide for constituting the coating layer. Specifically, a chemical reaction may be conducted between the coating layer and the first layer when the surface of the first layer is coated with a solution containing the aliphatic polyamide synthesized beforehand to form the coating layer. Alternatively, a chemical reaction may be conducted between the coating layer and the first layer when the membrane including the first layer is immersed in a solution containing the aliphatic polyamide synthesized beforehand to form the coating layer.

Furthermore, a chemical reaction may be conducted between the coating layer and the first layer when the coating layer is formed by preparing a composite-semipermeable-membrane element which will be described later and then passing the polymer solution therethrough. Alternatively, use may be made of a method in which the polyfunctional aliphatic amine and the polyfunctional aliphatic carboxylic acid compound are directly reacted on the surface of the first layer to form an aliphatic polyamide constituting the coating layer and simultaneously form amide bonds with the crosslinked aromatic polyamide constituting the first layer.

It is preferable that in forming amide bonds between the coating layer and the first layer, the carboxylic acid groups are brought to a state high in reaction activity according to need. For example, a reaction between acid chloride groups possessed by the crosslinked aromatic polyamide just after the interfacial polymerization and amino groups possessed by the aliphatic polyamide may be utilized. Alternatively, a reaction between acid fluoride groups possessed by the aliphatic polyamide just after completion of the reaction of the polyfunctional aliphatic amine with the polyfunctional aliphatic carboxylic acid compound and amino groups possessed by the crosslinked aromatic polyamide may be utilized.

Use of a reaction aid (condensation promoter) is especially preferred from the standpoint of highly efficiently forming amide bonds in a short time period. As the condensation promoter, any of the same compounds exemplified above in (2-4-1) is suitable for use. By utilizing these reactions, amide bonds can be highly efficiently formed between the coating layer and the first layer in a short time period.

The reaction time and the concentration of the condensation promoter in the formation of amide bonds between the coating layer and the first layer can be suitably regulated in accordance with the solvent and condensation promoter to be used and the chemical structures of the polymer and crosslinked aromatic polyamide. From the standpoint of production efficiency, the reaction time is preferably 24 hours or less, more preferably 1 hour or less, still more preferably 10 minutes or less, especially preferably 3 minutes of less. During the reaction, heating may be performed according to need. After completion of the reaction, the obtained composite semipermeable membrane may be washed with water, hot water, or an appropriate organic solvent to remove the reactive compounds.

(3) Utilization of the Composite Semipermeable Membrane

The composite semipermeable membrane of the present invention is suitable for use in a spiral composite-semipermeable-membrane element, produced by winding the composite semipermeable membrane around a cylindrical water collection pipe having a large number of holes formed therein, together with a feed-water channel material such as a plastic net, and a permeate channel material such as tricot, and optionally with a film for enhancing the pressure resistance. Such elements can be connected serially or in parallel and housed in a pressure vessel to prepare a composite-semipermeable-membrane module.

The composite semipermeable membrane or the element or module thereof can be combined with a pump for supplying feed water thereto, a device for pretreating the feed water, etc. to configure a fluid separator. By using this fluid separator, feed water can be separated into a permeate, e.g., drinking water, and a concentrate which has not passed through the membrane, thereby obtaining the desired water.

Higher operation pressures for the fluid separator result in an improvement in solute removal ratio but result in an increase in the amount of energy required for the operation. Because of this and in view of the durability of the composite semipermeable membrane, the operation pressure at the time when the water to be treated is caused to pass through the composite semipermeable membrane is preferably 0.5 MPa or higher and 10 MPa or less. The temperature of the feed water is preferably 5° C. or higher and 45° C. or lower since the solute removal ratio decreases as the temperature rises and the membrane permeation flux decreases as the temperature declines. In cases when the pH of the feed water is high, there is a possibility that use of feed water having a high solute concentration, e.g., seawater, might cause a scale of magnesium, etc. In addition, high-pH operations may deteriorate the membrane. It is hence preferred to operate the fluid separator at a pH in a neutral range.

Examples of the feed water to be treated with the composite semipermeable membrane of the present invention include liquid mixtures having a TDS (total dissolved solids) of 500 mg/L or higher and 100 g/L or less, such as seawater, brackish water, and wastewater. In general, the term "TDS" means the content of total dissolved solids, which is represented by "weight volume" or "weight ratio". According to a definition, a TDS value can be calculated from the weight of residues obtained by filtering the feed water with a 0.45-μm filter and vaporizing the filtrate solution at a temperature of 39.5° C. or higher and 40.5° C. or lower. However, a simpler method is to convert from a practical salinity (S).

EXAMPLES

The present invention will be described below in more detail with reference to Examples. However, the present invention is not limited by the following Examples in any way.

(1) Preparation of Composite Semipermeable Membranes

Reference Example 1

A 16.0 wt % DMF solution of a polysulfone (PSf) was cast in a thickness of 200 μm on nonwoven polyester fabric (air permeability, 2.0 cc/cm$^2$/sec) under the conditions of 25° C., and this nonwoven fabric was immediately immersed in pure water and allowed to stand for 5 minutes. Thus, a support membrane was prepared.

The obtained support membrane was immersed in a 3 wt % aqueous solution of m-phenylenediamine (m-PDA) for 2 minutes and then slowly pulled up in the vertical direction. Nitrogen was blown against the support membrane from an air nozzle to remove the excess aqueous solution from a surface of the support membrane. Thereafter, in an environment having a room temperature regulated to 40° C., a 40° C. decane solution containing 0.165 wt % trimesoyl chloride (TMC) was applied to the surface of the support membrane so that the membrane surface was completely wetted, and the coated support membrane was allowed to stand for 1 minute. The support membrane was subsequently held vertically for draining to remove the excess solution and then dried by heating at 80° C. for 1 minute. Thus, a composite semipermeable membrane having a first layer (layer of a crosslinked aromatic polyamide) was obtained.

Comparative Example 1

The composite semipermeable membrane having a first layer obtained in Reference Example 1 was used as such.

Comparative Example 2

The compound 2 shown in Table 1 was dissolved in pure water in the concentration shown in Table 1 to prepare a polymer solution. Thereafter, the obtained polymer solution was applied to the first-layer-side surface of the first-layer-including composite semipermeable membrane obtained in Reference Example 1 and this composite semipermeable membrane was immersed in the polymer solution at 25° C. for 1 hour and then washed with pure water. Thus, a composite semipermeable membrane having a coating layer was prepared.

Comparative Examples 3 to 16 and Examples 1 to 7

The compound 1 and compound 2 (Comparative Examples 3 to 9 and 11 to 16 and Examples 1 to 7) shown in Table 1 or 2 or the compound 1, compound 2, and compound 3 (Comparative Example 10) shown in Table 1 were dissolved in pure water in the concentrations shown in Table 1 or 2. Thereafter, 4-(4,6-dimethoxy-1,3,5-triazin-2-yl)-4-methylmorpholinium chloride was dissolved therein as a condensation promoter in the same molar concentration as the compound 1 shown in Table 1 or 2, and the resultant mixture was stirred at 25° C. for 1 hour. Thus, polymer solutions were prepared. The compound 2 used in Comparative Examples 3 to 10 and 13 was the following compound (ii).

[Chem. 3]

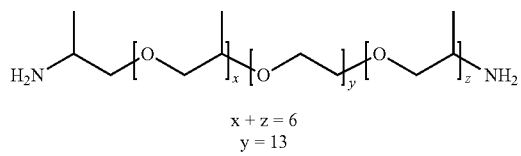

(ii)

x + z = 6
y = 13

The obtained polymer solutions were each applied to the first-layer-side surface of the first-layer-including composite semipermeable membrane obtained in Reference Example 1, and this composite semipermeable membrane was immersed in the obtained polymer solution at 25° C. for 1 hour and then washed with pure water. Thus, composite semipermeable membranes each having a coating layer were prepared.

Example 8

The compound 1 and compound 2 shown in Table 2 were dissolved in pure water in the concentrations shown in Table 2. Thereafter, 4-(4,6-dimethoxy-1,3,5-triazin-2-vl)-4-methylmorpholinium chloride was dissolved therein as a condensation promoter in the same molar concentration as the compound 1 shown in Table 2, and the resultant mixture was stirred at 25° C. for 1 hour to prepare a polymer solution.

In the obtained polymer solution was dissolved 4-(4,6-dimethoxy-1,3,5-triazin-2-yl)-4-methylmorpholinium chloride in a concentration of 1,000 ppm. The resultant mixture was stirred at 25° C. for 10 minutes to obtain a solution. This solution was applied to the first-layer-side surface of the first-layer-including composite semipermeable membrane obtained in Reference Example 1, and this composite semipermeable membrane was immersed in the solution at 25° C. for 1 hour and then washed with pure water. Thus, a composite semipermeable membrane having a coating layer was prepared.

(2) Analysis of the Composite Semipermeable Membranes for Surface Element Composition by X-ray Photoelectron Spectrometry Each composite semipermeable membrane was dried in a vacuum at 25° C. The coating-layer-side surface of the composite semipermeable membrane was subjected to wide-scan analysis by X-ray photoelectron spectrometry in the range of from 0 eV to 1,400 eV. The conditions were as follows.

X-Ray photoelectron spectroscope: SSX-100, manufactured by SSI, U.S.A.

Excitation X rays: aluminum Kα1 ray, Kα2 ray (1,486.6 eV)

X-Ray output: 10 kV 20 mV

Photoelectron take-off angle: 30°

Using an analysis software belonging to the spectroscope, the proportion (molar ratio) of the number of atoms of each of various detected elements was obtained from the XPS spectrum. The proportion of the number of fluorine atoms to the total number of atoms of all the elements is an average of values obtained by examining three portions of each sample. The N/O ratio is a value calculated by dividing the number of nitrogen atoms by the number of oxygen atoms and is an average of values obtained by examining three portions in a similar manner.

The depth to which the composition can be analyzed by XPS is about 10 nm at the most from the sample surface. In this examination, since the photoelectron take-off angle was 30°, it is thought that the depth to which the composition was analyzed was about 5 nm from the sample surface.

(3) Static Contact Angle Measurement

Each composite semipermeable membrane was washed with ultrapure water, dried in a vacuum at 25° C. for 12 hours, and then fixed to the top of a contact-angle measuring table so that the separation functional layer faced upward and the membrane was flat. A 2-μL water droplet was formed on the tip of a syringe needle and this syringe needle tip was brought near to the composite semipermeable membrane from right above to thereby adhere the water droplet to the surface of the separation functional layer. The syringe needle was brought away from the separation functional layer to separate the syringe needle from the adhered water droplet.

The angle between the water droplet and the surface of the separation functional layer at the time when 1 second had passed since the separation of the water droplet from the syringe needle was measured as an after-1-second contact angle, and the angle between the water droplet and the surface of the separation functional layer at the time when 30 seconds had passed since the separation of the water droplet from the syringe needle was measured as an after-30-second contact angle. The measurement was recorded with a camera belonging to the measuring device and stored, and the contact angle at after each time period was calculated using an analysis software belonging to the measuring device. The measurement was made on three portions of each sample and an average for the obtained values was calculated.

The measurement was conducted using the following measuring device under the following conditions.

Static contact angle measuring device, contact angle meter (Drop Master 500) manufactured by Kyowa Interface Science Co., Ltd.

Liquid used: pure water

Droplet amount: 2 μL

Measuring method: drop method (1/2θ method)

(4) Surface Zeta Potential Measurement

Each composite semipermeable membrane was washed with ultrapure water and set for measurement in a cell for flat samples so that the surface of the separation functional layer of the composite semipermeable membrane was in contact with a monitor particle solution. As the monitor particle solution was used a measurement liquid obtained by dispersing monitor particles in 10 mM aqueous NaCl solution having a pH adjusted to 6 or 11.

Using the measurement liquids having the respective pH values, the surface zeta potential at pH 6 of the separation functional layer and the surface zeta potential at pH 11 of the separation functional layer were measured. The value of [surface zeta potential at pH 6 of the separation functional layer]-[surface zeta potential at pH 11 of the separation functional layer] was calculated. The measurement was made on three portions of each sample at each pH, and an average for the obtained values was calculated.

The measurement was conducted using the following measuring device under the following conditions.

Surface zeta potential measuring device: electrophoresis light-scattering photometer (ELS-8000) manufactured by Otsuka Electronics Co., Ltd.

Monitor particles: polystyrene latex particles (particle diameter, 500 nm; having been subjected to a surface coating with hydroxypropyl cellulose) manufactured by Otsuka Electronics Co., Ltd.

(5) Performance Evaluation of the Composite Semipermeable Membranes

Seawater adjusted so as to have a temperature of 25° C. and a pH of 7 (TDS (total dissolved solids) concentration, 3.5%) was supplied to each of the composite semipermeable membranes obtained in (1) above, at an operation pressure of 5.5 MPa to conduct a water passing test of the membrane and determine membrane performances (salt removal ratio and permeation rate) just after production.

The salt removal ratio was determined using the following equation.

Salt removal ratio(%)=100×{1−(TDS concentration in permeate)/(TDS concentration in feed water)}

The permeation rate ($m^3/m^2/day$) was determined from the amount of permeate (m) obtained per day per square meter of the membrane surface under the conditions shown above.

(6) Antifouling Property Test

After the evaluation of membrane performances just after production described in (5) above, dry milk was added to the seawater in a concentration of 100 ppm and this seawater was passed through the membrane at a temperature of 25° C. and an operation pressure of 5.5 MPa for further 1 hour. Thereafter, the permeation rate was measured. The ratio thereof to the permeation rate just after production ([permeation rate after addition of dry milk]/[permeation rate just after production]) was calculated as a retention of permeation rate.

(7) Antifouling Property Test after Contact with Acid

The composite semipermeable membranes obtained in (1) above were each immersed for 24 hours in 25° C. pure water having a pH adjusted to 2, subsequently washed with pure water having a pH of 7, and then examined for permeation rate ($m^3/m^2/day$) in the same manner as in (2) above. Thereafter, dry milk was added to the seawater in a concentration of 100 ppm and this seawater was passed through the membrane at a temperature of 25° C. and an operation pressure of 5.5 MPa for further 1 hour. The permeation rate was then measured. The ratio thereof to the permeation rate before the addition of dry milk ([permeation rate after addition of dry milk]/[permeation rate before addition of dry milk]) was calculated as a retention of permeation rate.

(8) Test for Examining Recovery of Permeation Rate by Contact with Alkali after Antifouling Property Test Each composite semipermeable membrane which had been tested in (3) above was immersed for 30 minutes in 25° C. pure water having a pH adjusted to 12, subsequently washed with pure water having a pH of 7, and then examined for permeation rate ($m^3/m^2/day$) in the same manner as in (2) above. Thereafter, the ratio thereof to the permeation rate just after production ([permeation rate after contact with alkali]/[permeation rate just after production]) was calculated as a recovery of permeation rate.

The chemical structures of the separation functional layers of the composite semipermeable membranes obtained in the Examples and Comparative Examples and properties and performance values of the membranes are shown in Tables 1 to 4.

TABLE 1

| | | | Configuration of separation functional layer | | | | |
|---|---|---|---|---|---|---|---|
| | | | | Coating layer | | | |
| | | First layer | Compound 1 | Compound 2 | Compound 3 | Amide bonds with first layer | Crosslinking |
| Comparative Example | 1 | layer obtained in Reference Example 1 | — | — | — | absent | absent |
| | 2 | | — | Poly(allyiamine) (weight-average molecular weight, 15000) | — | absent | absent |
| | 3 | | Perfluoro-3,6,9-dioxaoctane-1,8-dioic acid | compound (ii) | — | absent | absent |
| | 4 | | Perfluoroactanedioic Acid | compound (ii) | — | absent | absent |
| | 5 | | Perfluoroactanoic Acid | compound (ii) | — | absent | absent |
| | 6 | | Perfluorohexanedioic Acid | compound (ii) | — | absent | absent |
| | 7 | | Perfluorobutanedioic Acid | compound (ii) | — | absent | absent |
| | 8 | | Perfluorooctanoic Acid | compound (ii) | — | absent | absent |
| | 9 | | Perfluorooctanoic Acid | compound (ii) | — | absent | absent |

TABLE 1-continued

| | | | | | | |
|---|---|---|---|---|---|---|
| 10 | Perfluorooctanoic Acid | compound (ii) | poly(ethyleneglycol) diglycidylether (weight-average molecular weight, 500) | absent | present |
| 11 | Perfluorobutanedioic Acid | Poly(2-aminoethylacrylamide) (weight-average molecular weight, 5500) | — | absent | present |
| 12 | Perfluorooctanedioic And | Ethylenediamine | — | absent | absent |
| 13 | Perfluorooctanedioic Acid | compound (ii) | — | absent | absent |
| 14 | Perfluorobutanedioic Acid | N,N-bis(2-aminoethyl) methylemine | — | absent | absent |
| 15 | Perfluoroheptanedioic Acid | Chitosan | — | absent | present |
| 16 | Difluoromaionic Acid | Ethylenediamine | — | absent | absent |

| | | Concentration | | |
|---|---|---|---|---|
| | | Compound 1 (ppm) | Compound 2 (ppm) | Compound 3 (ppm) |
| Comparative Example | 1 | — | — | — |
| | 2 | — | 2500 | — |
| | 3 | 1800 | 5000 | — |
| | 4 | 2000 | 5000 | — |
| | 5 | 2200 | 5000 | — |
| | 6 | 1500 | 5000 | — |
| | 7 | 1000 | 5000 | — |
| | 8 | 440 | 1000 | — |
| | 9 | 4400 | 10000 | — |
| | 10 | 4400 | 10000 | 1000 |
| | 11 | 500 | 6000 | — |
| | 12 | 6500 | 1000 | — |
| | 13 | 500 | 1000 | — |
| | 14 | 500 | 6000 | — |
| | 15 | 5000 | 2000 | — |
| | 16 | 4500 | 1200 | — |

TABLE 2

Configuration of separation functional layer

Coating layer

| | | First layer | Compound 1 | Compound 2 | Amide bonds with first layer | Crosslinking | Concentration Compound 1 (ppm) | Concentration Compound 2 (ppm) |
|---|---|---|---|---|---|---|---|---|
| Example | 1 | layer obtained in Reference Example 1 | Perfluorohexariedioic Acid | Ethylenediamine | absent | absent | 5000 | 1000 |
| | 2 | | Difluoromalonic Acid | N,N-bis(2-aminoethyl) methylamine | absent | absent | 800 | 5600 |
| | 3 | | Perfluoroethanedioic Acid | N,N-bis(2-aminoethyl) methylamine | absent | absent | 4000 | 2500 |
| | 4 | | Perfluorohexanedioic Acid | N,N-bis(2-aminoethyl) methylamine | absent | absent | 5000 | 2000 |
| | 5 | | Perfluorooctanoic Acid | Poly(2-aminoethyl acrylamide) (weight-average molecular weight, 5500) | absent | absent | 3000 | 3500 |
| | 6 | | Perfluorooctanoic Acid | Poly(allylamine) (weight-average molecular weight, 15000) | absent | absent | 4500 | 2500 |
| | 7 | | Perfluoro-3,6,9-dioxaoctane-1,8-dioic acid | Poly(ethyleneimine) (weight-average molecular weight, 70000) | absent | present | 5000 | 2500 |

TABLE 2-continued

| | Configuration of separation functional layer | | | | | |
|---|---|---|---|---|---|---|
| | Coating layer | | | | | |
| | | | | Amide bonds with first layer | Crosslinking | Concentration | |
| First layer | Compound 1 | Compound 2 | | | Compound 1 (ppm) | Compound 2 (ppm) |
| 8 | Perfluorooctanedioic Acid | Poly(vinylamine) (weight-average molecular weight, 20000) | present | present | 2500 | 5000 |

15

TABLE 3

| | | Static contact angle measurement | | | | |
|---|---|---|---|---|---|---|
| | | X-Ray photoelectron spectrometry | | Contact angle at 1 second after droplet adhesion (A) (°) | Contact angle at 30 seconds after droplet adhesion (B) (°) | Change in contact angle with lapse of time (A)-(B) (°) | Surface zeta potential Difference in potential between pH 6 and pH 11 (mV) |
| | | Proportion of the number of fluorine atoms (%) | N/O ratio — | | | | |
| Comparative Example | 1 | 0.0 | 0.8 | 45 | 42 | 3 | 8 |
| | 2 | 0.0 | 1.2 | 25 | 13 | 12 | 16 |
| | 3 | 1.9 | 0.6 | 30 | 22 | 8 | 5 |
| | 4 | 2.8 | 0.6 | 35 | 25 | 10 | 6 |
| | 5 | 3.4 | 0.6 | 39 | 30 | 9 | 3 |
| | 6 | 2.0 | 0.6 | 33 | 27 | 6 | 5 |
| | 7 | 1.1 | 0.6 | 34 | 22 | 12 | 4 |
| | 8 | 0.4 | 0.8 | 34 | 24 | 10 | 5 |
| | 9 | 6.7 | 0.5 | 49 | 40 | 9 | 5 |
| | 10 | 5.5 | 0.4 | 43 | 38 | 5 | 5 |
| | 11 | 0.4 | 1.0 | 27 | 19 | 8 | 17 |
| | 12 | 9.2 | 0.9 | 54 | 43 | 11 | 8 |
| | 13 | 0.5 | 0.7 | 35 | 25 | 10 | 6 |
| | 14 | 0.5 | 1.4 | 26 | 21 | 5 | 20 |
| | 15 | 8.0 | 0.7 | 51 | 37 | 14 | 12 |
| | 16 | 0.4 | 1.3 | 28 | 21 | 7 | 13 |
| Example | 1 | 8.0 | 0.8 | 40 | 28 | 12 | 8 |
| | 2 | 0.5 | 1.3 | 39 | 28 | 11 | 14 |
| | 3 | 0.5 | 0.8 | 42 | 35 | 7 | 9 |
| | 4 | 6.7 | 0.9 | 34 | 20 | 14 | 10 |
| | 5 | 5.0 | 1.0 | 38 | 19 | 19 | 14 |
| | 6 | 7.5 | 1.0 | 40 | 19 | 21 | 15 |
| | 7 | 5.3 | 0.9 | 30 | 14 | 16 | 15 |
| | 8 | 3.0 | 1.2 | 35 | 13 | 22 | 17 |

TABLE 4

| | | Membrane performance just after production | | Results of antifouling property test Retention of permeation rate (—) | Results of antifouling property test after contact with acid Retention of permeation rate (—) | Test for examining recovery of permeation rate by contact with alkali after antifouling property test Recovery of permeation rate (—) |
|---|---|---|---|---|---|---|
| | | Salt removal ratio (%) | Permeation rate (m³/m²/day) | | | |
| Comparative Example | 1 | 99.70 | 0.87 | 0.70 | 0.60 | 0.71 |
| | 2 | 99.75 | 0.73 | 0.76 | 0.70 | 0.82 |
| | 3 | 99.82 | 0.71 | 0.75 | 0.65 | 0.76 |

TABLE 4-continued

|  |  | Membrane performance just after production | | Results of antifouling property test Retention of permeation rate (−) | Results of antifouling property test after contact with acid Retention of permeation rate (−) | Test for examining recovery of permeation rate by contact with alkali after antifouling property test Recovery of permeation rate (−) |
|---|---|---|---|---|---|---|
|  |  | Salt removal ratio (%) | Permeation rate (m³/m²/day) |  |  |  |
|  | 4 | 99.81 | 0.73 | 0.74 | 0.66 | 0.77 |
|  | 5 | 99.80 | 0.73 | 0.76 | 0.63 | 0.77 |
|  | 6 | 99.80 | 0.73 | 0.76 | 0.68 | 0.78 |
|  | 7 | 99.78 | 0.75 | 0.75 | 0.69 | 0.78 |
|  | 8 | 99.78 | 0.75 | 0.74 | 0.68 | 0.77 |
|  | 9 | 99.80 | 0.66 | 0.78 | 0.71 | 0.80 |
|  | 10 | 99.80 | 0.63 | 0.80 | 0.73 | 0.82 |
|  | 11 | 99.80 | 0.75 | 0.83 | 0.76 | 0.85 |
|  | 12 | 99.81 | 0.76 | 0.82 | 0.76 | 0.85 |
|  | 13 | 99.80 | 0.73 | 0.82 | 0.75 | 0.84 |
|  | 14 | 99.80 | 0.74 | 0.82 | 0.77 | 0.86 |
|  | 15 | 99.80 | 0.75 | 0.81 | 0.75 | 0.86 |
|  | 16 | 99.78 | 0.73 | 0.80 | 0.76 | 0.85 |
| Example | 1 | 99.78 | 0.80 | 0.87 | 0.83 | 0.86 |
|  | 2 | 99.80 | 0.79 | 0.86 | 0.82 | 0.88 |
|  | 3 | 99.81 | 0.78 | 0.86 | 0.82 | 0.87 |
|  | 4 | 99.80 | 0.82 | 0.89 | 0.84 | 0.88 |
|  | 5 | 99.78 | 0.82 | 0.91 | 0.86 | 0.91 |
|  | 6 | 99.83 | 0.82 | 0.91 | 0.85 | 0.95 |
|  | 7 | 99.80 | 0.84 | 0.91 | 0.90 | 0.95 |
|  | 8 | 99.82 | 0.85 | 0.93 | 0.92 | 0.97 |

It can be seen, as apparent from the Examples, that the composite semipermeable membrane of the present invention not only has high water permeability and excellent antifouling properties but also is excellent in terms of the stability of the antifouling properties after contact with acids.

While the present invention has been described in detail and with reference to specific embodiments thereof, it will be apparent to one skilled in the art that various changes and modifications can be made therein without departing from the spirit and scope thereof. This application is based on a Japanese patent application filed on Dec. 26, 2018 (Application No. 2018-242776), the contents thereof being incorporated herein by reference.

The invention claimed is:

1. A composite semipermeable membrane comprising:

a substrate;

a porous support layer disposed on the substrate; and a separation functional layer disposed on the porous support layer, wherein the separation functional layer comprises:

a first layer comprising a crosslinked aromatic polyamide that is a polymer of a plurality of polyfunctional aromatic amine groups and a plurality of polyfunctional aromatic acid chloride groups linked by a plurality of amide groups; and a coating layer existing on the first layer and comprising an aliphatic polyamide that includes a fluorine atom and comprises one or more structures of the following structure group (i):

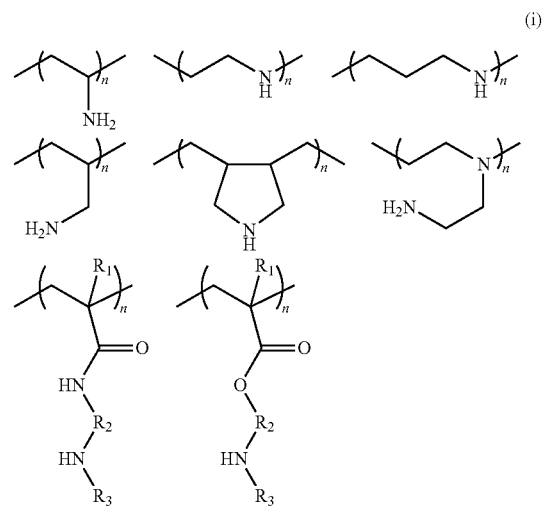

wherein n is an integer of 100 or smaller, $R_1$ is a hydrogen atom or a methyl group, $R_2$ is an alkylene group having a carbon number of 1 to 3, and $R_3$ is a hydrogen atom or an alkyl group having a carbon number of 1 to 3, and the composite semipermeable membrane has a proportion of the number of fluorine atoms to the total number of atoms of all elements of 0.5% or more and 8% or less, as measured by X-ray photoelectron spectrometry conducted by irradiating the composite semipermeable membrane with X rays from a side of the coating layer, and a ratio (N/O ratio) of the number of nitrogen atoms to the number of oxygen atoms of 0.8 or more and 1.3 or less, as measured by the X-ray photoelectron spectrometry.

2. The composite semipermeable membrane according to claim 1, wherein in a static contact angle measurement conducted by vacuum-drying the composite semipermeable membrane at 25° C. for 12 hours and then adhering 2 μL of a droplet of pure water to a surface of the separation functional layer, a contact angle is 20 degrees or less at 30 seconds after adhering the droplet of pure water to the surface of the separation functional layer.

3. The composite semipermeable membrane according to claim 2, wherein in the static contact angle measurement, the contact angle at 30 seconds after adhering the droplet of pure water to the surface of the separation functional layer is smaller by at least 15 degrees than a contact angle at 1 second after adhering the droplet of pure water to the surface of the separation functional layer.

4. The composite semipermeable membrane according to claim 1, wherein the aliphatic polyamide is crosslinked at least either intramolecularly or intermolecularly.

5. The composite semipermeable membrane according to claim 1, wherein the aliphatic polyamide is bonded to the first layer by amide bonds.

6. The composite semipermeable membrane according to claim 1, wherein a surface zeta potential of the separation functional layer at pH 6 is higher by at least 15 mV than a surface zeta potential of the separation functional layer at pH 11.

\* \* \* \* \*